UNITED STATES PATENT OFFICE.

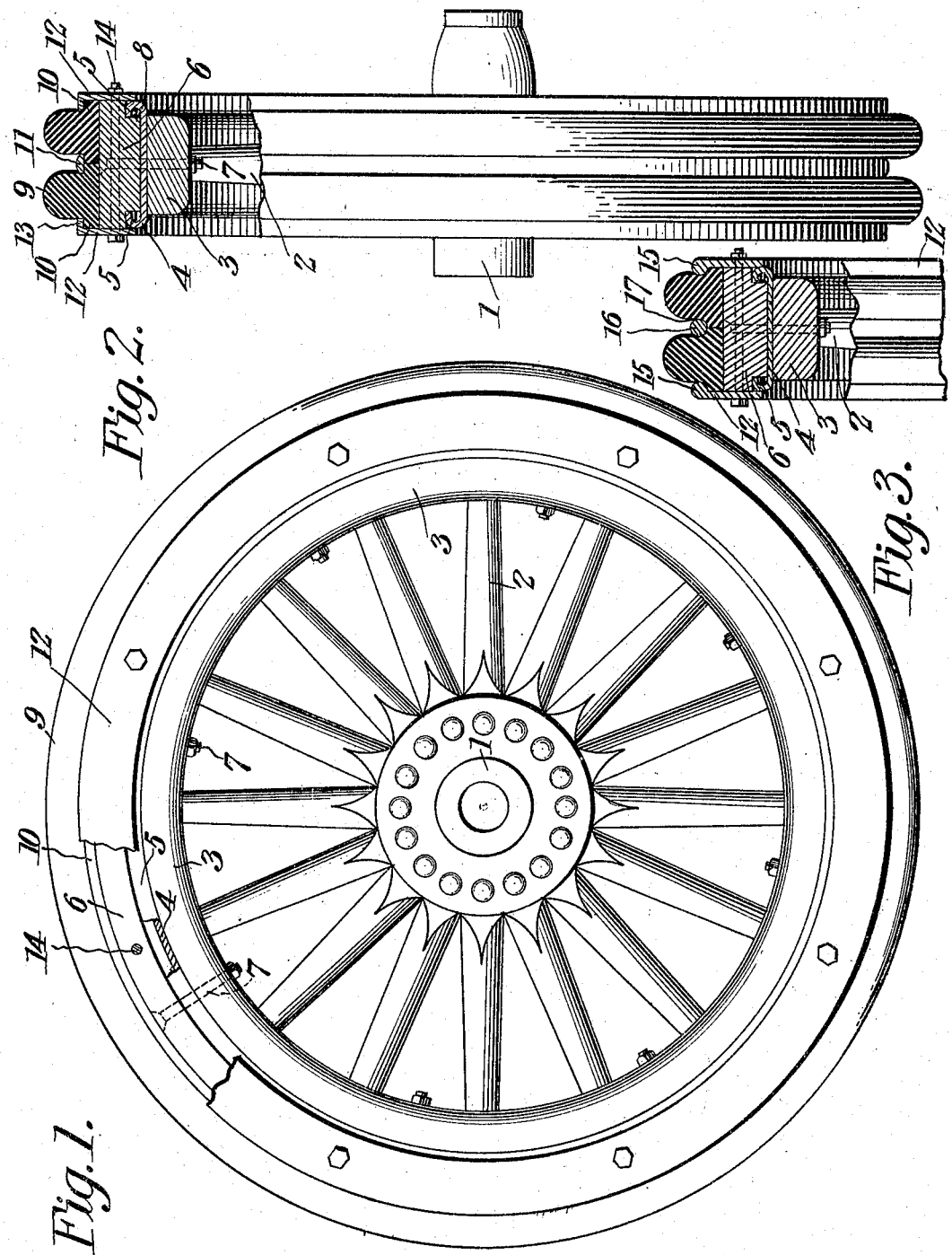

EUGENE F. SOBERS, OF BETHLEHEM, PENNSYLVANIA.

TIRE.

No. 855,024.　　　　Specification of Letters Patent.　　　　Patented May 28, 1907

Application filed July 27, 1906. Serial No. 328,095.

*To all whom it may concern:*

Be it known that I, EUGENE F. SOBERS, a citizen of the United States, residing at Bethlehem, in the county of Northampton and State of Pennsylvania, have invented a new and useful Tire, of which the following is a specification.

This invention relates to rubber tired wheels of that type having a plurality of annular tires of solid rubber arranged side by side and suitably clamped to the wheel felly.

The invention has for one of its objects to improve, simplify, cheapen, and render more durable and efficient, rubber tired wheels of this character.

A further object of the invention is to provide a tire which is adapted to be used interchangeably on wheels of ordinary construction intended for pneumatic tires of various types.

With these objects in view, and others, as will appear as the nature of the invention is better understood, the invention comprises the various novel features of construction which will be more fully described hereinafter and set forth with particularity in the claims appended hereto.

In the accompanying drawing, which illustrates one of the embodiments of the invention, Figure 1 is a front elevation of a wheel with portions broken away to more clearly illustrate the details of the invention. Fig. 2 is a side elevation of the wheel with a portion thereof in section. Fig. 3 is a fragmentary sectional view of a modified form.

Corresponding parts in the several figures are indicated throughout by similar characters of reference.

In the present instance I have elected to illustrate the invention applied to a wheel of the artillery type ordinarily used for automobiles and intended for use in connection with clencher pneumatic tires. I desire, however, to be understood as not limiting the invention to this use, since the same can be used with other wheel constructions.

Referring to the drawing, 1 designates the hub, 2 the spokes, and 3 the felly of a wheel, the said parts being of any approved construction. Extending around the periphery of the felly 3 is a tire holder 4 which is usually constructed of iron formed with its edges rounded outwardly and turned toward each other to form overhanging clenching rims or shoulders 5 for holding a clencher tire on the felly. This holder is secured to the felly in any desired manner.

In order to apply one or more solid tires to a wheel of this general type, an annular member 6 is provided which surrounds the holder and serves as a means for attaching the tire securing devices or clamping plates. This annular member 6 is preferably made of wood in segmental pieces of suitable length that are secured to the wheel by radially extending bolts 7 that pass through registering perforations in the felly 3, holder 4 and segments of the member 6. The sides of the member 6 are cut away at the internal surface so as to form a central tongue 8 that is adapted to fit snugly between the rims or shoulders 5 of the clencher tire holder, so that movement of the segments forming the member 6 is prevented. The internal surface of the member 6 is held positively against the external surface of the holder 4 by the bolt 7. As shown in Fig. 2, the member 6 is T-shaped in cross section.

The member 6 serves as an auxiliary felly which substantially fills the space between the flanges of the clencher rim or tire holder, and extending circumferentially of this member are solid tires 9, preferably of rubber or other suitable material.

At the base portion of the tires 9 are outwardly extending integral flanges 10. The tires are arranged on the auxiliary felly, so that adjacent flanges 10 of juxtaposed tires are in contact. Around these contacting flanges are annular fastening devices 11 in the nature of metal hoops or rings. These rings coöperate with clamping rings 12 whose outer edges are provided with right-angularly disposed rims 13 that embrace the outside flanges 10 of the two outermost tires. These clamping rings preferably coöperate at each side of the clencher rim or holder, and are securely held in place by through bolts 14 passing through registering openings in the clamping rings and auxiliary felly 6.

Referring to the construction shown in Fig. 3, the clamping rings 12 are provided with rounded rims 15 in the nature of a beading, and the annular fastening devices 16 are preferably circular in cross section. The rubber tires have their bottom flanges 17 curved to conform to the shape of the members 15 and 16. The remaining portion of the construction is the same as that already described in connection with Figs. 1 and 2.

While I have shown and described a wheel shod with two rubber tires, it is obvious that the invention can be carried out in certain of its features with a single tire wheel, or with a wheel having a greater number of tires.

From the foregoing description, taken in connection with the accompanying drawing, the advantages of the construction will be readily appreciated by those skilled in the art to which the invention appertains.

Furthermore, it will be obvious that with a wheel constructed according to the principles set forth, the tires can be easily removed for renewal or repair, and, moreover, wheels ordinarily constructed for tires of other character can be readily equipped with solid tires, when desired.

I have described the principle of operation of the invention, together with the apparatus which I now consider to be the best embodiment thereof, but I desire to have it understood that the apparatus shown is merely illustrative, and that various changes may be made, when desired, as are within the scope of the invention.

What is claimed is:—

1. The combination with a vehicle wheel, and a clencher tire holder thereon, of an annular member cut away at its sides to fit between the rims of the holder, fastening devices passing through the member and tire holder and also through the felly of the wheel, a plurality of tires extending around the said annular member and bearing on the same, a fastening ring between adjacent tires, clamping rings disposed on the sides of the said member and coöperating with the first mentioned ring for holding the tires in position the clamping rings coöperating with said tire holder to center the tires relatively to the wheel and fastening devices passing through the clamping ring and annular member.

2. The combination with a vehicle wheel, and a clencher rim thereon, of an auxiliary felly having a portion arranged between the flanges of the rim, fastening devices for securing the auxiliary felly in position, a plurality of tires having base extensions bearing against the periphery of the auxiliary felly and arranged with the extensions of adjacent tires in contact, an annular member arranged between the tires and engaging the adjacent base extensions for holding the latter against the auxiliary felly, flanged clamping rings engaging the outermost base extensions and coöperating with the said annular member for holding the tires on the auxiliary felly, said clamping rings coöperating with the outer sides of the flanges of the said clencher rim, and bolts passing through the auxiliary felly and clamping rings.

3. The combination with a vehicle wheel, and a clencher rim thereon, of an auxiliary felly fitting the said rim and adapted to receive a tire, and a pair of clamping members arranged at opposite sides of the felly to secure the tire thereon and coöperating with the sides of the clencher rim to hold the auxiliary felly centered relatively to the plane of rotation of the wheel.

4. The combination with a vehicle wheel and a clencher tire holder thereon, of an annular member cut away at its sides to fit between the rims of the holder, bolts passing through the member and tire holder together with the felly of the wheel, tires extending around the said annular member, a fastening ring intermediate the tires, and clamping rings coöperating with the first mentioned ring and the tire holder for holding the tires on the said member.

In testimony that I claim the foregoing as my own, I have hereto affixed my signature in the presence of two witnesses.

EUGENE F. SOBERS.

Witnesses:
  H. B. STERN,
  CHAS. N. MILLER.